TOLL SUPERVISION

Filed April 23, 1958 4 Sheets-Sheet 1

INVENTOR.
CLARENCE E. LOMAX

BY

ATTY.

SELECTOR
200 & 200'

INVENTOR.
CLARENCE E. LOMAX
BY
C.A. Gulbrandsen
ATTY.

Aug. 1, 1961 C. E. LOMAX 2,994,744

TOLL SUPERVISION

Filed April 23, 1958 4 Sheets-Sheet 3

PULSE REPEATER 400

TOLL DIAL TRUNK 300

INVENTOR.
CLARENCE E. LOMAX
BY
C. A. [signature]
ATTY.

Aug. 1, 1961 C. E. LOMAX 2,994,744
TOLL SUPERVISION
Filed April 23, 1958 4 Sheets-Sheet 4
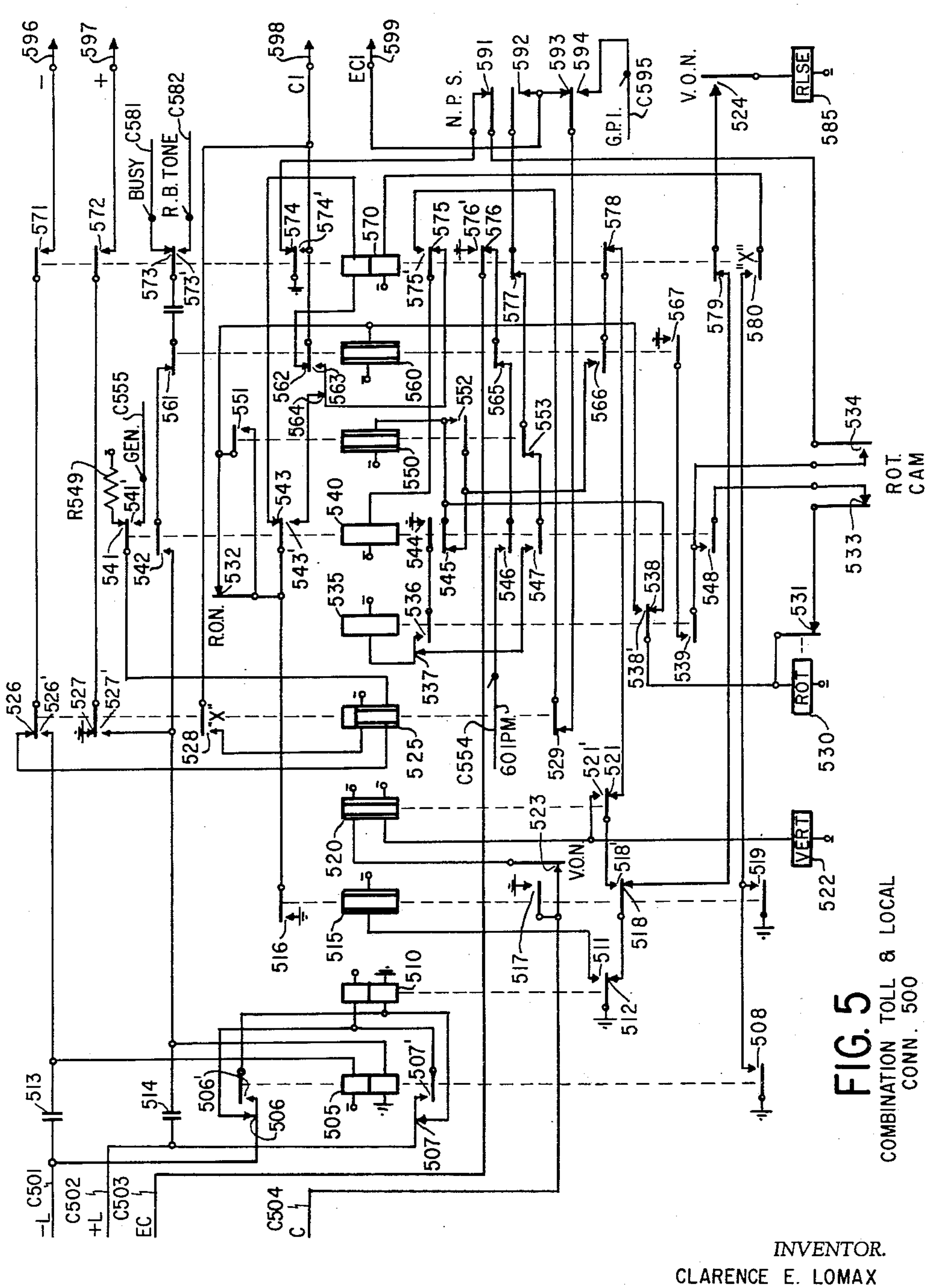
FIG. 5 COMBINATION TOLL & LOCAL CONN. 500
*INVENTOR.*
CLARENCE E. LOMAX
BY
C. A. Gulbrandsen
ATTY United States Patent Office 2,994,744

Patented Aug. 1, 1961

2,994,744

TOLL SUPERVISION

Clarence E. Lomax, Hastings, Nebr., assignor to Automatic Electric Laboratories, Inc., a corporation of Delaware Filed Apr. 23, 1958, Ser. No. 730,417
11 Claims. (Cl. 179—27)

The present invention relates to automatic telephone systems in general, but is concerned more particularly with improvements in automatic switching apparatus for signalling a toll operator upon the extension of a call to a called subscriber station from a dial toll switchboard.

It is an object of the present invention to provide an impulsing source in the switching apparatus, arranged to transmit EC type impulses over an extra control conductor (EC) back to toll equipment to indicate by visual means only, the progress and trunking conditions upon loop impulses being received at the switching apparatus from a toll operator's position.

It is another object of the invention to provide an impulsing source of the above-mentioned type, which provides a visual indication at the toll operator's position for distinguishing the different EC type impulsing conditions of a switch train in the progress of extending a connection.

A feature of the invention resides in the utilization of a combined Toll Dial Trunk and Pulse Repeater, which accepts EC type impulsing from succeeding switches to permit a visual indication of the trunking conditions at a toll operator's position while blocking the audible tones of the line loop from reaching the toll operator's headset.

Another feature of the invention in combination with the above-mentioned feature, resides in the relay network of the combined Toll Dial Trunk and Pulse Repeater which permits the extension of the toll operator's loop circuit beyond the apparatus only when a called line is seized and a reversal in polarity on the succeeding loop has taken place.

Further features of the invention pertain to the particular arrangement of the relay network in the trunking equipment and the automatic switches whereby the above-outlined and additional operating features are attained.

The invention, both as to its organization and method of operation, together with further objects and advantages thereof, will best be understood by reference to the following specification taken in connection with the accompanying drawings, in which:

FIG. 5 shows a Combination Toll and Local Connector, including normal post springs, rotary off-normal springs, and cam springs, for permitting access to eleven rotary positions on each bank level.

Figure 1:
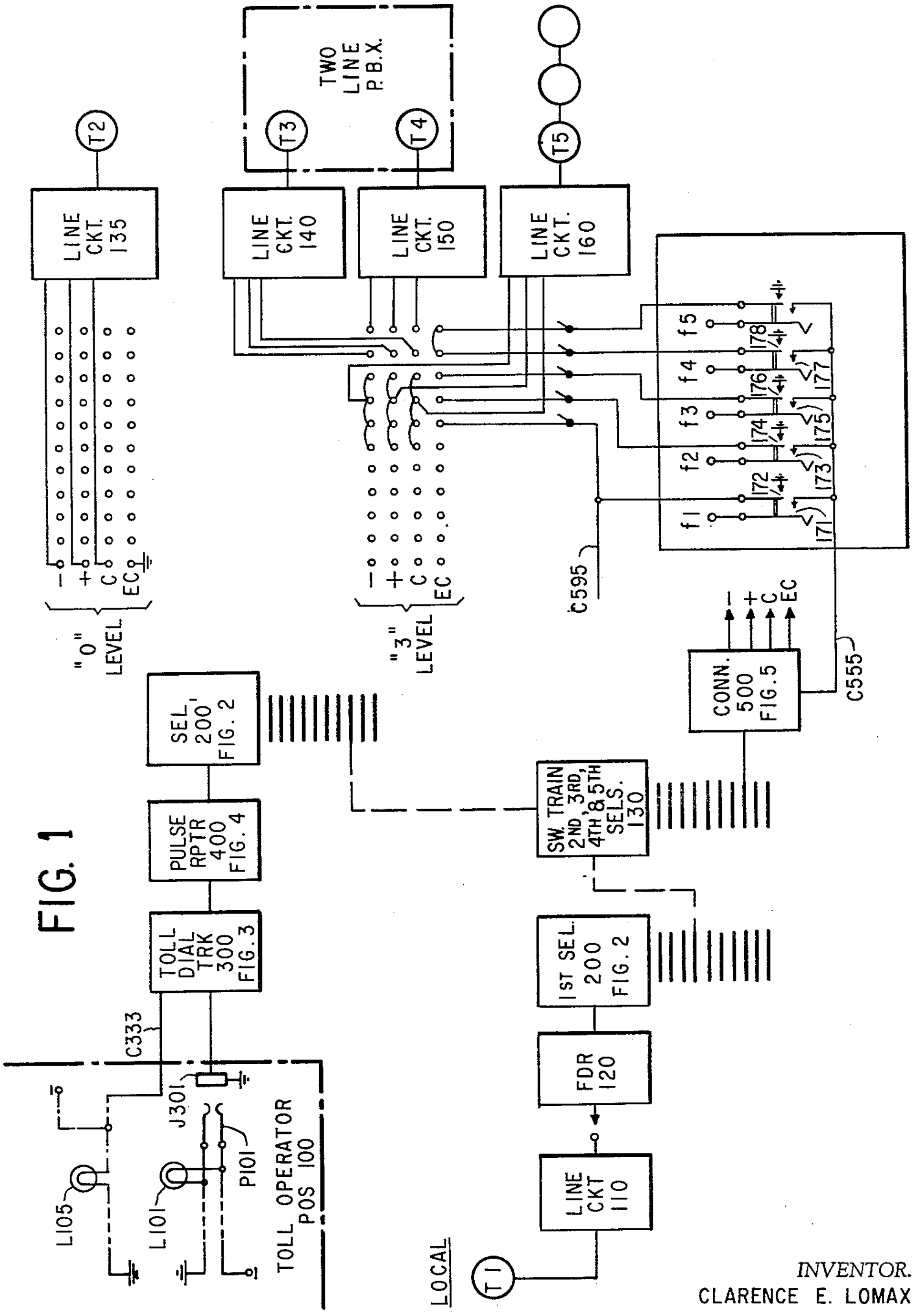
FIG. 1 is a schematic trunking diagram illustrating portions of a switch train and a toll operator's position embodying the present invention.
Figure 4:
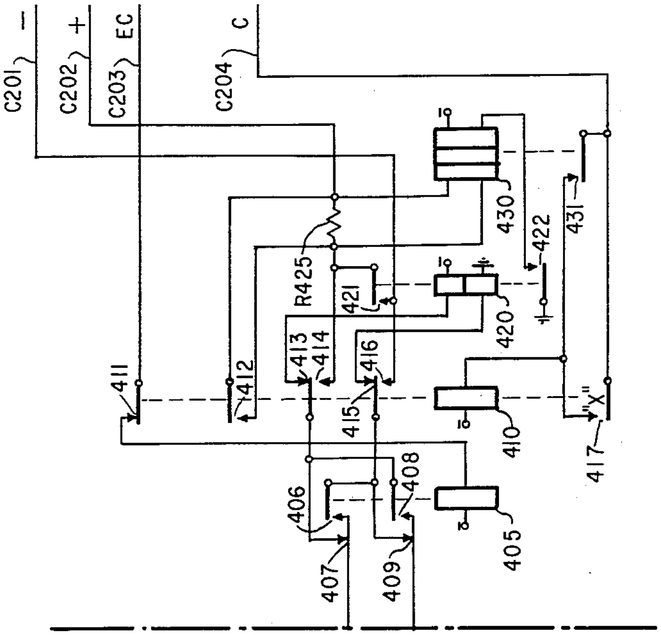
FIG. 4 shows a Pulse Repeater directly connected to by said Toll Dial Trunk for repeating all loop impulses into a switch train.

Referring briefly to the trunking diagram shown in FIG. 1, a local subscriber T1 is provided for making local calls, and a Toll Operator's Position 100 is provided for making toll calls. Upon making either a local or toll call the switch train includes selectors of the type shown in FIG. 2. Dial tone supplied from conductor C285 of FIG. 2, would, of course, not be present on selectors beyond the first selector and in the first selector of the toll switch train, the Selector 200, dial tone need not exist here either for reasons to be pointed out. On toll calls a Toll Dial Trunk 300 (FIG. 3) and a Pulse Repeater 400 (FIG. 4) are utilized to block all tones to the operator and repeat all digital impulses to the switch train, respectively. The mentioned tones would be dial tone (if used) and busy tone transmitted back to the Toll Dial Trunk over the preceding line loop, and would, as mentioned, be blocked from returning to the toll operator. Instead, ground pulses would be transmitted and repeated back to the Toll Dial Trunk 300, which would flash a supervisor lamp L101 at the Toll Operator's position 100, to visually indicate a condition of the connection. In other words, on an A.T.B. condition, 120 i.p.m. ground would be returned to flash the lamp L101 at the rate of 120 flashes per minute; on a busy line condition lamp L101 would flash at the rate of 60 flashes per minute; on a completed call to a subscriber the lamp would light steady without flashes; on a seized unequipped line the lamp L101 would fail to ignite at all. On local calls these ground pulses over the extra control conductor (EC) would be significant, and the local call would respond only to the line loop indications of dial tone and busy tone. These ground pulses over the extra control conductor EC will hereafter be referred to as EC pulses. The blocking arrangement of the tones and EC ground pulses signalling the toll operator visually, are controlled by a pair of polarized relays, one in the Trunk 300 and the other in the Repeater 400, and their operations will be more fully described in the detailed description to follow.

Referring briefly to FIG. 5, we have here a combination Toll and Local Connector 500. It serves single station lines, party lines and P.B.X lines. Only the tenth level can serve P.B.X lines having more than two trunks. The two trunk P.B.X's are to use the last two contacts on levels other than the tenth, that is, the 10th and 11th rotary position. Party lines have a terminal per station and can be connected to any level other than the tenth. The EC bank of the connector is used to permit any party line station to use any required frequency. This connector bank layout is shown in the trunking diagram of FIG. 1.

The use of the eleventh bank contact adds ten bank contacts over the normal 100 bank contacts of conventional connectors. Since there is no single finger hole on a conventional dial to dial the digit "11," the tenth and eleventh bank contacts are a "Two Line P.B.X," and the only way in which the eleventh bank contact can be reached, is if the tenth bank contact is found busy. This is accomplished by the use of a pair of rotary cam springs in the connector in which one spring operates on the tenth rotary position to cause automatic rotation of the wipers on a busy condition existing on the tenth rotary line, and the other cam spring operates on the eleventh rotary position to stop automatic rotation.

The "0" level of Connector 500 is an eleven trunk P.B.X, and utilizes normal post springs to initiate automatic rotation of the wipers and control ringing. However, only upon dialling the call number "01" will automatic rotation take place upon an existing busy condition. Dialing any busy P.B.X line other than the first of the group will return busy tone and 60 i.p.m. ground without automatic rotation. This was done to permit using P.B.X terminals other than the first as night call number and to get no automatic rotary service when they are busy.

A detailed explanation will now follow:

*Local call*

Figure 2:
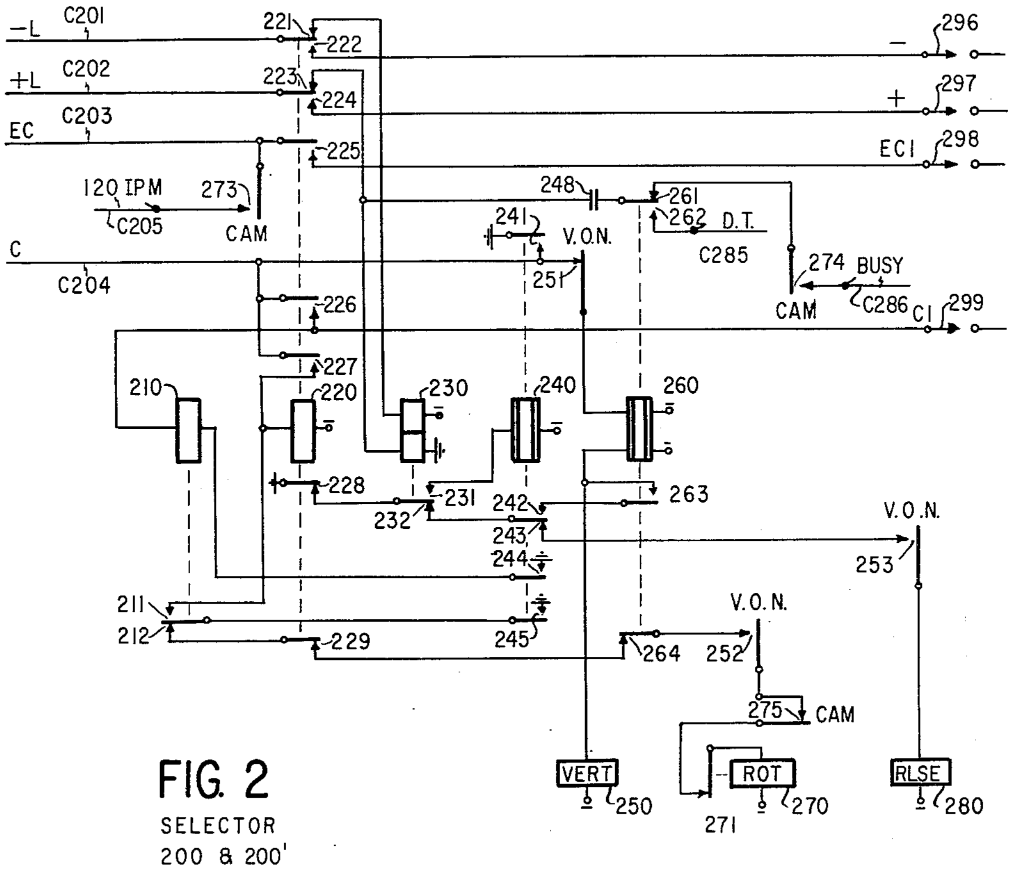
FIG. 2 shows a Selector utilized in the present switch train on any rank as either a local or toll selector.

Assuming that a substation, such as T1, desires to communicate with a party at substation T4, the calling party will initially remove the receiver to close the hookswitch therein. The resulting closure of the line loop will operate the line circuit 110 which, in turn, by means of an allotter (not shown) will cause a line finder 120, to search for and connect with the calling party in a manner well-known in the art. Finder 120 is linked with First Selector 200 (FIG. 2).

First Selector 200 is seized by battery, appearing on control conductor C204, via the upper winding of relay 260, and ground via finder 120 over conductor C204. This seizure operates relay 260. Also, upon seizure, the loop circuit from the calling party's handset operates relay 230; the circuit extending from the closed line loop extended through line circuit 110, and finder 120, on the one hand via negative conductor C201, contacts 221, upper winding of relay 230 to battery; and on the other hand by way of positive conductor C202, contacts 223, lower winding of relay 230 to ground. Relay 230 operates and closes at contacts 231 an obvious circuit to relay 240. Relay 260 closes at contacts 262, dial tone to the calling party via conductor C285, condenser 248, contacts 223 and back over positive conductor C202. Contacts 263 close and the operation of relay 240 closes contacts 242 to prepare a circuit to vertical magnet 250. Contacts 241 close ground to control conductor C204, to hold the preceding equipment in a well-known manner, and also maintains relay 260 operated. Contacts 244 close ground to control wiper 299 via the winding of relay 210. Contacts 245 close and a circuit is prepared to rotary magnet 270.

Upon receipt of the dial tone the calling party at substation T1 will proceed to dial in order to seize a second selector. Assuming the next digit dialled is the digit "7," the pulsing relay 230 intermittently releases during the dialling of the impulses and thereby intermittently opens and closes contacts 231 and 232. The relay 240 being slow-to-release remains operated during intermittent openings of contacts 231. During each closing of contacts 232 a circuit is completed via contacts 228 and 242 for slow-to-release relay 260 via its lower winding which is maintained operated responsive to the first impulse and remains operated during the remainder of the impulse series. Also, over the last-mentioned circuit vertical magnet 250 is intermittently energized to step the wipers 296, 297, 298, and 299 accordingly. Upon the wipers taking their first initial step, the VON springs operate whereby, VON contacts 251 opens the original operating circuit to relay 260; and VON contacts 252 close and further prepare a circuit to rotary magnet 270. Upon completion of the series of dial pulses, wipers 296–299 will be on the seventh level of bank contacts and relay 260 restores to remove dial tone and deenergize vertical magnet 250 via contacts 263. Contacts 264 closes the circuit to rotary magnet 270; the circuit extending from ground, contacts 245, 212, 229, 264, 252, 275, 271, winding of rotary magnet 270 to battery. By means of its self-interrupter contacts 271, rotary magnet 270 deenergizes and energizes to rotate the wipers over the seventh level in search of an idle second selector.

Assuming that a second selector is found idle, control wiper 299 will engage a bank contact having battery thereon to operate relay 210. The operation of relay 210, at contacts 212, opens the rotary circuit to prevent further rotation of the wipers. Contacts 211 closes an obvious circuit to relay 220. Relay 220 operates and at contacts 222 and 224 extends the loop circuit to the second selector. Contacts 225 closes the EC conductors also, however, it being ineffective on a local type call. Contacts 221 and 223 open the circuit to relay 230. Contacts 226 and 227 close whereby relay 220 locks operated to control conductor of the succeeding switch via wiper 299 upon a change in polarity taking place in a well-known manner. The restoration of relay 230 at contacts 231 opens the circuit to slow-to-release relay 240. Relay 240 restores after a short interval and at contacts 241 opens the original holding circuit to the preceding equipment, however, at closed contacts 226 ground is returned from the succeeding switch to hold the preceding equipment. Contacts 245 opens the circuit to relay 210, to cause restoration thereof. The second selector is now ready to accept the second series of digital impulses.

Assuming that no idle second selector was found during the rotation of the wipers of Selector 200, the wipers would rotate to the overflow or eleventh rotary position to operate the cam springs whereby; cam contacts 273 would close but would be ineffective on a local type call; cam contacts 274 would close busy tone back to the calling party via conductor C286; cam contacts 275 would open to prevent further rotation of the wipers. Upon receipt of the busy tone, the calling party would replace the receiver to open the loop circuit and restore relay 230. At contacts 231, relay 230 would open the circuit to relay 240. At contacts 232 and the eventual restoration of slow-to-release relay 240 at contacts 243 would close a circuit to release magnet 280. Release magnet 280 energizes and restores the wipers 296–299 to normal, to in turn restore the VON springs whereby; VON contacts 251 close and the opening of contacts 241 places battery on control conductor C204 to avail Selector 200 for future use; VON contacts 253 opens the circuit to release magnet 280 to cause deenergization thereof. Prior to the restoration of the wipers, the opening of contacts 241 removed ground from control conductor C204 to release the preceding equipment in a well-known manner.

The Switch Train 130, shown in the trunking diagram of FIG. 1, as mentioned comprises a second, third, fourth, and fifth selector. These last-mentioned selectors may be identical to Selector 200 (FIG. 2) with the exception that conductor C285 containing dial tone thereon would not be included. Therefore, it will be assumed that these selectors have been seized in a manner explained with respect to first selector 200, and upon the receipt of digital impulses. It will further be assumed that upon receipt of the fifth series of digital impulses that Combination Toll and Local Connector 500 (FIG. 5) is seized.

Connector 500 (FIG. 5) is seized by the fifth selector of Switch Train 130, upon the control wiper therein contacting battery during rotation on control conductor C504 via VON contacts 523 and upper winding of relay 520. The loop circuit will thus be extended to operate relay 510; the circuit extending via battery, upper winding of relay 510, contacts 506, negative conductor C501, back over the loop, positive conductor C502, contacts 507, lower winding of relay 510 to ground. At contacts 511, relay 510 closes an obvious circuit to relay 515. Relay 515 operates, and at contacts 516 closes a circuit via RON contacts 532 to operate relay 560. At contacts 517 ground is closed via control conductor C504 to hold the preceding equipment in a well-known manner, and also maintains relay 520 operated. Relay 520 operates and contacts 521' closes to prepare a locking circuit for itself and a circuit to vertical magnet 522. Relay 560 operates and closes contacts 563 to place battery on control wiper 598 via contacts 575 and the winding of relay 540. Contacts 566 close and a circuit is prepared to relay 550.

The next digit dialled into Connector 500 will be the digit "3" whereupon pulsing relay 510 intermittently releases during the dialling of the impulses, and thereby intermittently opens and closes contacts 511 and 512. The relay 515 being slow-to-release remains operated during intermittent openings of contacts 511. During each closing of contacts 512 a circuit is completed via contacts 518' and 521' for slow-to-release relay 520 via its lower winding which is maintained operated responsive to the first impulse and remains operated during the remainder of the impulse series. Also, over the last-mentioned circuit vertical magnet 522 is intermittently energized to step the wipers 596, 597, 598, and 599 one step for each ground pulse received. Upon the wipers taking their first vertical step, the VON springs operate whereby; VON contacts 523 opens the original operating circuit to relay 520; VON contacts 524 close to prepare a circuit to release magnet 585. At the end of the impulse series the wipers 596–599 are on the third level of bank contacts, and slow-to-release relay 520 restores after a short duration.

The next digit dialled by the calling partly will be the digit "8" whereupon pulsing relay 510 will again intermittently release during the dialling of the impulses. This second dialled digit will send ground pulses to relay 550 and rotary magnet 530; the first circuit extending from ground, contacts 512, 518', 521, 578, 566, 545, and winding of relay 550 to battery; and the second circuit including contacts 538, and winding of rotary magnet 530 to battery. To some extent, relay 560 is a slave of relay 550 in that it relieves relay 550 of some spring load which is the relay that must stay operated during rotary pulsing. It will later be seen, however, that relay 560 gives a service independent of relay 550. Rotary magnet 530 will thus energize and deenergize to rotate the wipers 596–599 over the third level of bank contacts, and as the wipers take their first rotary step the RON springs operate whereby contacts 532 opens the circuit to relay 560 however, relay 550 operated and at closed contacts 551 an alternate circuit to relay 560 was provided to maintain this relay operated. It is to be pointed out also that relay 560 is slow-to-release and should RON contacts 532 open before contacts 551 close, this relay would not release. Contacts 552 closed an alternate circuit during pulsing to maintain relay 550 operated. The wipers are being stepped to the eighth bank contacts but the first line or any other line on this level may be busy. Passing over a busy line, control wiper 598 will engage ground and operate relay 540 via contacts 563, and 575, but relay 560 being operated will prevent ground pulses from conductor C554 being returned over the EC conductor C503, which will be more fully explained in the ensuing description. Also, relay 560 being operated in advance and having contacts 562 open, also prevents ground over control wiper 598 from operating relay 570 before relay 540 has time to operate. Dialling over busy lines results in relay 540 trying to open the pulsing circuit to rotary magnet 530 and relay 550, but relay 550 being already operated over the mentioned alternate route prevents it. The pulsing circuit differs from the usual way in that it is taken through a break contact (578) of relay 570 before going to rotary magnet 530. It will be seen why it was necessary in the ensuing description.

Assuming that the called line is found idle, at the termination of the impulse series, relay 550 will restore and the wipers 596–599 will lie on the eighth rotary position engaging their respective bank contacts. The restoration of relay 550 at contacts 551 opens the circuit to relay 560 to cause restoration thereof. The existing idle condition will cause control wiper to be engaging battery, and the restoration of relay 560 at contacts 562 closes said battery through winding of relay 570 to cause operation thereof via contacts 543 and 516. The EC wiper 599 will engage an intermittent ground from the ringer interrupter 170 (FIG. 1). Ringing interrupter 170, as mentioned, is of the conventional type wherein the rotation of a cam (not shown) intermittently closes a different ringing frequency over a ringing interrupter lead C555. In other words, as the cam rotates, contacts 171 and 172 close first and then open before the second pair of contacts 173 and 174 close, etc. The EC wiper 599 is engaging the eighth bank contact which in this case will receive a ground pulse every time contacts 176 close during the rotation of the cam, which will close a circuit to relay 540 via NPS contacts 593, contacts 529, and contacts 575' upon the mentioned operation of relay 570. When relay 570 operated, it closed its "X" contacts 580 first to close an obvious locking circuit through its lower winding via contacts 519. At contacts 571 and 572 the intermittent ringing circuit is prepared to the called subscriber. Contacts 574' close ground to replace battery on control wiper 598 to hold the succeeding equipment in a well-known manner. Contacts 576' close and ground is returned over EC conductor C503, however without effect on local type calls. In ringing interrupter 170 the simultaneous intermittent closing of contacts 175 with contacts 176, causes relay 540 to operate, and at contacts 541' the ringing frequency via conductor C555 is transmitted to the called subscriber; the circuit extending from battery superimposed on the ringing frequency $f3$ (FIG. 1), conductor C555 (FIG. 5), contacts 541', lower winding of relay 525, contacts 526, 571, wiper 596, negative side of the line through line circuit 160, the ringers on the line, and back over the positive side of the line, wiper 597, contacts 572 and 527 to ground. Relay 525 will not operate over this circuit due to the resistance in the called party's ringer. It is to be understood that only the ringer (not shown) of substation T5 would respond to the ringing frequency $f3$ since it would be correspondingly set for this particular ringing frequency. At contacts 542, relay 540 closes ringback tone to the calling subscriber via conductor C582, contacts 573, 561, 542, condenser 514, and back over the positive side of the line including conductor C502.

Upon receipt of the ringing frequency, the subscriber at substation T5 will lift the receiver, and open the ringer resistance circuit to operate relay 525. Relay 525 will operate only its "X" contacts 528 upon being energized through its lower winding whereby a locking circuit is closed through its upper winding to operate this relay fully; the circuit extending from battery, upper winding of relay 525, contacts 528 and 574' to ground. At contacts 529, relay 525 will prevent any further ground pulses from effecting relay 540. At contacts 526' and 527' a loop circuit is closed from relay 505 through the called subscriber's handset over an obvious circuit. Relay 505 operates and at contacts 508 closes a second ground to maintain relay 570 operated. Contacts 506' and 507' close and contacts 506 and 507 open to reverse the polarity from relay 510 across the preceding loop circuit. Relay 505 and 510 will provide transmission battery to the called and calling parties respectively. Conversation will now take place.

Assuming that substation T5 was found busy control wiper 598 would engage ground, whereby relay 570 will not operate. As previously mentioned, relay 560 will restore after rotation, however, relay 560 is slow-to-release and before it releases the ground from control wiper 598 will be closed via contacts 563 and 575 to operate relay 540. The operation of relay 540 at contacts 543' closes a locking circuit to itself via ground at contacts 516 upon relay 560 restoring, whereby the contacts 564 close to complete the locking circuit to relay 540 before contacts 563 open the original operating circuit. The restoration of relay 560 will cause a make (564), before break (563), before make (562). At contacts 542 busy tone from conductor V581 (via contacts 573 and 561) will be transmitted back over the positive side of the line to notify the calling party of the busy condition. At contacts 546 ground pulses from conductor C554 (60 i.p.m.) will be transmitted over the EC conductor C503 however, without effect on a local type call.

Assuming that the call was intended for the two line P.B.X and substation T3 or T4, the dialling would be the same with the exception of the last digit, which in that case would be the digit "0." Substation T4 of the two line P.B.X is on the eleventh bank contacts of level 3 and naturally cannot be dialled directly, whereby as previously mentioned T4 can only be reached if substation T3 is found busy.

Upon receipt of the ten digital impulses the wipers 596–599 will step to their respective tenth bank contacts on level "3," which will in this case operate the cam contacts 534 of the rotary cam springs and prepare an interrupter circuit to rotary magnet 530. At the end of dialling rotary magnet 530 will restore. Assuming the line is found idle, relay 550 will restore, to in turn restore relay 560. As relay 560 restores and since relay 540 is not operated, relay 570 will operate from battery via control wiper 598 in a manner previously described. The remaining operations will be the same as previously described with the exception that ringing frequency $f5$ will now be utilized for ringing the called substation T3 via line circuit 140.

Had substation T3 been found busy (ground on control wiper 598), relays 540, 550, and 560 will be operated at the end of dialling. Relays 550 and 560 as mentioned are slow-to-release to permit relay 540 to close the interrupter circuit to rotary magnet 530 since relay 570 did not operate on the busy condition. This interrupter circuit is traced from ground, contacts 574, NPS contacts 591, right rotary cam contacts 534, contacts 543, left rotary cam contacts 533, contacts 531, winding of rotary magnet 530 to battery. This ground is also passed to relay 550 via contacts 538 to prevent slow-to-release relay 550 from restoring, to in turn maintain relay 560 operated. The reenergization of rotary magnet 530 will step the wipers to their eleventh bank contacts respectively, to in turn open cam contacts 533 of the left rotary cam springs and prevent further attempts to rotate the wipers even though this line may also be busy. Assuming the line is idle, relays 550 and 560 will restore after a short duration, relay 570 will operate to in turn operate relay 540 as previously described. The ringing frequency $f5$ will also be utilized on the eleventh bank contact and will be transmitted to substation T4 via line circuit 150. The called party will thus answer and operate connector 500 in a manner previously described.

Had substation T4 also been found busy, relays 550 and 560 will restore after automatic rotation, and relay 540 will have locked operated in a manner previously described (contacts 575, 564, 543', and 516 to ground). Busy tone will thus be returned to the calling party in a manner previously described, to signify that both lines are busy.

Assuming that a call was intended for a substation in the P.B.X group on the tenth level, and first assuming substation T2, the following sequence is necessary. In order to reach substation T2, the digits "0" and "1" must be dialled into connector 500. As mentioned, there can be only one P.B.X group on the "0" level, and since the P.B.X being called has a call number "01," it means it is an eleven trunk P.B.X. The "0" level lines must be signalled with 20 cycles ringing because we need to use the EC lead for P.B.X service, and the ringing pulses on the tenth level are ground pulses supplied over GP1 (conductor C595).

Upon receipt of the ten digital impulse series, the wipers 596–599 will be stepped to the tenth or "0" level to operate the normal post springs NPS whereby: NPS contacts 591 opens the prepared interrupter circuit to rotary magnet 630; NPS contacts 592 close and prepare a circuit to relay 535; NPS contacts 593 opens the prepared circuit to relay 540; NPS contacts 594 prepares ground pulses from conductor C595 to relay 540. At this time relays 510, 515, and 560 are operated. Upon receipt of the next digital impulse, the digit "1," rotary magnet 530 and relay 550 will operate in series over the previously traced circuit to step the wipers to their respective first bank contacts on the "0" level. Assuming the called line is found to be idle, slow-to-release relays 550 and 560 and rotary magnet 530 restore, and relay 570 will operate and lock as before mentioned. Ground pulses from conductor C595 will now intermittently pulse relay 540 via contacts 594, 529, 575', and winding of relay 570 to battery. Relay 540 will thus transmit 20 cycle ringing to the called party and ring-back tone to the calling party in a manner previously disclosed. The ground on EC wiper 599 being ineffective on an idle condition.

Assuming however, that the called line was found to be busy, slow-to-release relay 560 remains operated long enough to close ground from control wiper 598 (indicating a busy condition) to operate relay 540. The operation of relay 540 at contacts 547 closes the ground from EC wiper 599 to relay 535; the circuit extending from ground, wiper 599 NPS contact 592, contacts 577, 553, 547, 537, winding of relay 535 to battery. Relay 535 operates and at contacts 536 locks operated to ground at contacts 544. At contacts 538' and 539 an interrupter circuit is closed to rotary magnet 530, and a circuit is closed in series to maintain slow-to-release relay 560 operated before it had time to restore; the first circuit extending from ground, contacts 567, 539, 548, 533, 531, winding of rotary magnet 530 to battery; and the second circuit including contacts 538' and winding of relay 560 to battery. Rotary magnet 530 energizes and by means of its self-interrupter contacts 531 will rotate the wipers in search of an idle P.B.X line. Relay 560 being slow-to-release will remain operated during the intermittent openings of interrupter contacts 531. Upon the wipers finding an idle P.B.X line, battery will be found by control wiper 598 to cause relay 540 to restore. The restoration of relay 540 will open the rotary circuit, and open the circuit to relays 540 and 560 causing their respective restorations. Relay 570 will thus operate and initiate the ringing in a manner previously described.

Had no idle P.B.X line been found during automatic rotation of the wipers, the left rotary cam springs (contacts 533) will open the rotary circuit on the eleventh rotary position. The right rotary cam springs (contacts 534) are made ineffective on the tenth level by the normal post springs when the wipers rotate over the tenth rotary position. The opening of the rotary circuit will cause rotary magnet 530 to restore, and also restore slow-to-release relay 560 after a short duration. The restoration of relay 560 will cause relay 540 to lock operated via contacts 516 as previously described, whereby busy tone will be transmitted back to the calling party for notification of the busy condition existing on the entire P.B.X group.

Calling any busy P.B.X line other than the first P.B.X line ("01") will not operate relay 535, because only the EC bank contact 1 on the "0" level has ground connected directly to it. In other words, if a calling party dials any of the P.B.X lines from ("02" to "00"), ground will not be present on the EC bank contact and automatic rotation of the wipers will not take place. This was done to permit using P.B.X terminals other than the first on the "0" level as a night call number and to get no automatic rotary service when they are busy. The result will be a busy tone from the connector. It is more than likely that no more than one P.B.X line would be in use at night however, any number of lines could be utilized but these lines would have to be directly dialled to since no automatic rotation would take place.

*Release—Local*

The release of the equipment is under the control of the calling subscriber. When the called subscriber hangs up, the loop circuit to relay 505 is opened causing its restoration. At contacts 506 and 507, and 506' and 507' the incoming loop circuit will have a reversal of polarity from relay 510 however, it will be ineffective on a local type call. At contacts 508, one of the multiple grounds locking relay 570 operated is opened.

When the calling subscriber at substation T1 hangs up, the loop circuit to relay 510 is opened. Relay 510 restores and opens the circuit to slow-to-release relay 515. After a short duration, relay 515 restores, removes holding ground from control conductor C504, and opens the locking circuit to relay 570. Relay 570 restores; opens the locking circuit to relay 525 to cause restoration thereof; removes ground from control wiper 598 to restore the succeeding equipment; and closes a circuit to release magnet 585. The last mentioned circuit extending from battery winding of release magnet 585, VON contacts 524, contacts 579, 518, 512 to ground. Release magnet 585 will thus energize to restore the wipers to their normal position, which in turn, restore the normal post springs (if operated); restore the RON spring (close contacts 532); restore the left and right rotary cam springs (if operated); and restore the VON springs whereby; at VON contacts 523 battery is placed on control conductor C504 to avail Connector 500 for seizure; and open VON contacts 524 to deenergize the release magnet 585. Connector 500 is now available for seizure.

The Switch Train 130 will restore in a well-known manner, to in turn, restore Selector 200, Finder 120, and Line Circuit 110, all in a well-known manner.

*Toll call*

Referring briefly to FIG. 1, there is shown a Toll Operator's Position 100 for accepting toll calls made herein, and for extending the call to a substation in the immediate area of the associated exchange. The operator will make the call only by plugging into a jack that has a trunk lamp L105 lighted to indicate it is idle. Also a cord supervisory lamp L101 for supervising the call is utilized.

Figure 3:
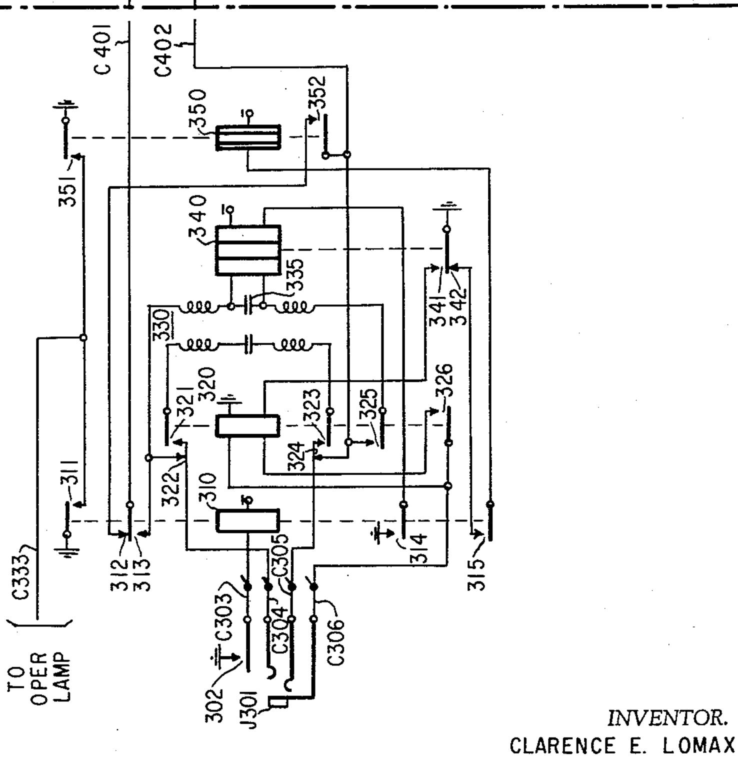
FIG. 3 shows a Toll Dial Trunk including a jack for being plugged into by a toll operator for initiating the extension of a toll call.

The toll operator upon receiving the call number wanted from a calling subscriber, will insert her plug P101 into the jack J301 extending to Toll Dial Trunk 300, FIG. 3.

Upon insertion of the plug P101 into jack J301, an obvious circuit is closed to relay 310 via contacts 302. Relay 320 operates in series with the cord supervisory lamp L101 via conductor C306 and jack J301, but current flows only through the upper high resistance winding of relay 320 and leaves the lamp L101 extinguished. Relay 310 operates, and at contacts 311 places ground on conductor C333, to shunt the trunk lamp L105 at the Operator's Position 100, to cause extinguishing thereof indicating the seizure of the Toll Dial Trunk 300. Relay 310 closes the line loop to relay 420 in Pulse Repeater 400 (FIG. 4); the circuit extending from battery, upper winding of relay 420, contacts 413, 407, negative conductor C401, contacts 313, upper secondary winding of repeat coil 330, left hand winding of polar relay 340, lower secondary winding of repeat coil 330, contacts 325, positive conductor C402, contacts 409, 415, lower winding of relay 420 to ground. Relays 310 and 320 close circuits to the two windings of polar relay 340, but relay 340 is poled to not operate over these circuits. Relay 420 operates and at contacts 421 closes a loop circuit including resistor R425 to Selector 200′ (FIG. 2). Also relay 310 at contacts 315 closes an obvious circuit to operate relay 350. Relay 350 operates, and at contacts 351 places a second shunt ground on conductor C303 to maintain lamp L105 extinguished. At contacts 352, relay 350 prepares a hunting circuit to relay 420.

Selector 200′ will respond in a manner described in the section titled "Local Calls." In this case however, conductor C285 containing dial tone would not be present herein, although even if it were used, the trunk line to the selector is isolated from the toll jack so that tones of any kind cannot reach the toll operator or toll line. Relay 420 also puts current through the two windings of polar relay 430, but relay 430 is poled to not operate at this time.

The operator will proceed to dial, and the turning of the dial (not shown) opens the sleeve to let relay 320 restore. The restoration of relay 320 switches the lines through direct to the jack (contacts 322 and 324 close), so that relay 420 can respond to dial pulses, and by means of its interrupter contacts 421 repeat these pulses to Selector 200′. If a selector in any rank finds all trunks busy on the selected level it will apply ground pulses to the EC conductor at the rate of 120 per minute. For instance, in Selector 200′ when the wipers 296–299 rotate to the eleventh rotary position in a manner previously described, the cam springs operate and at cam contacts 273, 120 i.p.m. ground will be transmitted from conductor C205 to EC conductor C203 and via contacts 411 to relay 405. Relay 405 will thus pulse at the rate of 120 impulses per minute to intermittently close and open contacts 406 and 408, and intermittently open and close contacts 407 and 409 to intermittently reverse polarity to polar relay 340. Before the automatic rotation of the wipers in Selector 200′, at the end of the dialling relay 320 again operated when the dial returned to normal to thus prevent the 120 i.p.m. tone being returned to the operator upon reopening contacts 322 and 324. Polarized relay 340 will thus intermittently operate at 120 interruptions per minute, and at contacts 341 will intermittently light the cord lamp L101 at the rate of 120 flashes per minute through the lower winding of relay 320. The 120 flashes per minute on the cord lamp is an indication to the operator that an all-trunks-busy condition has been encountered. Polar relay 340 responding to the 120 i.p.m. pulses results in it being operated about 250 ms. and restored for the same time, and its operating opens the circuit to relay 350 however, relay 350 is slow-to-release and will not restore at this rapid an opening of its operating circuit. The result is that when the operator receives the busy flashes and removes the plug to release the connection, relay 310 restores to shunt the trunk and delay the restoration of relay 420. This shunt is placed across the trunk at contacts 312 of restored relay 310 and contacts 352 of operated relay 350. This permits restored relay 310 to restore relay 350, so that relay 350 upon restoring can release the switches. The restoration of relays 310 and 350 would remove the shunt from conductor C333 and the trunk lamp L105 to cause igniting thereof.

It will now be assumed that the toll operator seizes Connector 500 via Dial Trunk 300, Repeater 400, Selector 200′ and the switch train 130 in a manner described in the section titled, "Local Call." Connector 500 will respond in the like manner previously described with the exception of the EC conductor which distinguishes between the two types of calls (Toll and Local), and the different results will be described in the succeeding description.

It will be recalled that in the section titled, "Local Call," when a busy line was encountered ground pulses from conductor C554 were transmitted back over the EC conductor C503, but were ineffective on local type calls. However, on a toll call, these ground pulses being 60 i.p.m., would be transmitted back over the EC wiper to operate relays 405 and 340 in Pulse Repeater 400 and Toll Dial Trunk 300 respectively, in the same manner as an all-trunks-busy conditions (120 i.p.m.). In this case, the supervisory lamp L101 would operate at 60 flashes per minute to indicate to the operator that the called line is busy. Again, after dialling this last digit relay 320 reoperated to prevent the 60 i.p.m. tone from being transmitted audibly to the operator.

It will be further recalled, that when Connector 500 seized the called line, relay 570 operated and at contacts 576′ placed a steady ground on EC conductor C503. This ground existing on the EC conductors through the preceding switches will operate relay 405, which will in turn operate polarized relay 340. The result of relay 340 operating will place a steady ground to the supervisory lamp L101 to ignite the lamp with a non-flashing condition, to indicate to the operator that the called line has been seized. Also, it will be recalled that when the called party answers, relay 505 in Connector 500 operates to reverse polarity back over the incoming loop, with the result that battery is reversed to the left winding of polarized relay 430 to cause its operation. Polar relay 430 in operating closes ground from control conductor C204 to switch-through relay 410, via contacts 431. Relay 410 operates, closing its "X" contacts 417 first to lock operated to control conductor C204 before contacts 412 close and the left winding of polar relay 430 is shunted to cause restoration and to improve transmission. At contacts 411, the circuit to relay 405 is opened, causing restoration thereof. At contacts 414 and 416, and the restoration of relay 405 at contacts 407 and 409, close the loop circuit from the toll operator to the called subscriber. The circuit to relay 420 is opened at contacts 415 and 416 to cause restoration thereof. Relay 405 in releasing takes the trunk out of the reversed polar condition, but the Connector 500 now feeds battery to the trunk in a reversed direction to what was supplied when relay 405 was operated, with the result that polar relay 340 restores to darken the cord lamp L101 to indicate that the call has been answered.

The toll operator upon the called party answering, will thus connect the calling party loop to the called party loop in a well-known manner, and conversation may then take place.

Referring briefly to Connector 500 (FIG. 5), if the toll operator inadvertently dials an unequipped line (a line having no subscribers or equipment associated therewith), control wiper 598 would engage neither ground nor battery. Relay 550 and rotary magnet would restore after dialling, and after a short duration slow-to-release relay 560 would restore. In this case, with no ground from control wiper 598, relay 540 cannot operate; and with no battery on control wiper 598 relay 570 cannot operate. Therefore, neither ground pulses from conductor C554 or a steady ground from contacts 576' will be present on EC conductor C503. The operator upon not receiving any type of visual signal of her supervisory lamp L101, and being aware that she has dialled the complete directory number wanted, will indicate to her that she has dialled a non-listed directory number. The toll operator will thus act as an intercept operator under this condition, and inform the calling subscriber of the existing situation over the calling loop circuit to the operator.

The above-mentioned switching equipment have thus provided a strictly visual indication of the switching conditions taking place during the extension of the call, and blocking all types of tones to the toll operator. These visual indications permit the operator to handle other calls without having to listen in on the line to receive the different audible tones indicating the different conditions existing during dialling.

*Release—Toll*

Upon the termination of the conversation, when the called party hangs up relay 505 in Connector 500 will restore to again reverse the polarity on the succeeding loop back to the same polarity that existed when Connector 500 was seized by the switch train. This original polarity on the loop will cause polarized relay 340 to reoperate. The reoperation of relay 340 opens the circuit to relay 350, which thereby restores. Also, ground is again closed through the lower winding of relay 320 to again ignite the supervisory lamp L101 to indicate to the operator that the called party has hung up.

The indicaion that the called party has hung up will prompt the operator to remove the plug P101 from the jack J301, with the result that relays 310 and 320 will restore, to in turn restore polar relay 340. The restoration of relay 310 will remove ground from conductor C333 to remove the shunt to trunk lamp L105 and permit igniting thereof. Also, the opening of the loop circuit will restore relay 510 in Connector 500 to initiate the release of Connector 500 and the preceding switch train in a manner previously described in the section titled, "Release—Local." The release of the switch train will remove ground from control conductor C204 in a well-known manner to restore relay 410. Relay 410 in restoring will avail Toll Dial Trunk 300, —Pulse Repeater 400, and Selector 200' for seizure, and in combination in a manner described.

While there has been described what is at present considered to be the preferred embodiment of the invention, it will be understood that various modifications may be made therein, and it is intended to cover in the appended claims all such modifications as fall within the true spirit and scope of the invention.

Having described my invention in detail, what I claim and desire to have protected by issuance of Letters Patent of the United States is set forth in the appended claims.

What is claimed is:

1. In a telephone exchange system, a calling line, a cord circuit, a toll trunk interconnecting a pulse repeater including an extra control EC conductor, automatic switches, one of said automatic switches providing the termination for said pulse repeater, means controlled via said cord circuit for operating said switches to build up a connection to a called line, a supervisory lamp in said cord circuit, a polarized relay controlling said supervisory lamp, a plurality of tone sources, means controlled by conditions existing during an attempted build-up of said connection for extending a tone from one of said tone sources back to said pulse repeater, a plurality of sources of interrupted ground pulses, means for transmitting ground pulses from one source of said interrupted ground pulses back over said EC conductor simultaneously with one of said tones, said polarized relay responsive only to said ground pulses over said EC conductor for flashing said supervisory lamp at a predetermined rate indicative of one of said conditions, blocking means in said pulse repeater for blocking all tones from being transmitted back over said cord circuit, and means responsive only to a called party answering a call upon the connection being extended thereto for removing said blocking means.

2. In a telephone exchange system, a local subscriber, a toll operator's position, a cord circuit, a toll trunk interconnecting a pulse repeater including an extra control EC conductor, automatic switches commonly accessible to either said local subscriber or said toll operator, one of said automatic switches providing the termination for said pulse repeater, means controlled via said cord circuit for operating said switches to build up a toll connection to a called line, means operated by the initiation of said local subscriber for controlling said switches to build up a local connection to the called line, a supervisory lamp in said cord circuit, a polarized relay in said toll trunk controlling said supervisory lamp, a plurality of tone sources controlled by conditions existing during an attempted build-up of said connection for extending a tone from one of said tone sources back over the connection, a plurality of sources of interrupted ground pulses transmitted back over said EC conductor simultaneously with one of said tones, said tones audibly indicative to a local caller as to the conditions existing during said build-up of said connection, blocking means in said pulse repeater for blocking all tones to said cord circuit, said polarized relay responsive only to said EC ground pulses for flashing said supervisory lamp at a predetermined rate indicative of said conditions for visibly indicating the condition existing during said attempted build-up of the connection to the called line.

3. In a telephone system, a toll operator's position, a plurality of subscriber lines, a trunk circuit interconnecting a pulse repeater, a plurality of numerical switches including extra control EC conductors therein, a connector having access to said plurality of subscriber lines, connecting means for extending a connection from said toll operator's position to one of said numerical switches via said trunk circuit and pulse repeater, a supervisory lamp at said toll operator's position, a polar relay in said trunk circuit, means for extending a loop circuit from said trunk circuit to successive idle numerical switches and to said connector responsive to the receipt of a plurality of digital impulses, a source of all-trunks busy tone connectable to each numerical switch and operated to transmit an all-trunks busy tone back over said connection responsive to an all-trunks busy condition existing at any one of said numerical switches, a first source of interrupted ground pulses transmitted back at a first predetermined rate over said EC conductor simultaneously with said all-trunks busy tone responsive to an all-trunks busy condition, a busy tone source in said connector transmitted back over said connection responsive to a busy line condition, a second source of interrupted ground pulses transmitted back at a second predetermined rate over said EC conductor simultaneously with said busy tone responsive to a busy line condition, blocking means in said pulse repeater for preventing all tones from reaching said toll operator's position, said polar relay responsive to interrupted ground pulses from said first source for flashing said supervisory lamp at a first predetermined rate to visually indicate an all-trunks busy condition, said polar relay responsive to said second source of interrupted ground pulses to flash said supervisory lamp at a second predetermined rate to visually indicate a busy line, and means in said connector for controlling the removal of said blocking means responsive only to a subscriber at a called line answering the call.

4. A telephone system as claimed in claim 3, including a second polar relay in said pulse repeater, reversing means in said connector for reversing the polarity over said connection to operate said second polar relay responsive to the answering by a called subscriber, and the operation of said second polar relay initiating the removal of said blocking means to permit conversation over said connection.

5. In a telephone exchange system, a calling line, a cord circuit, a toll trunk interconnecting a pulse repeater circuit including an extra control EC conductor therein, automatic switches, one of said automatic switches providing the termination of said pulse repeater, means controlled via said cord circuit for operating said switches to build up a connection to a called line, isolating means in said repeater circuit for extending a loop circuit and said EC conductor to succeeding automatic switches while isolating said loop circuit from said cord circuit, a supervisory lamp in said cord circuit, a polarized relay in said toll trunk controlling said lamp, a pulsing relay in said repeater circuit for controlling said polarized relay, a plurality of tone sources controlled by conditions existing during an attempted build-up of said connection for transmitting one of said tones back over said loop circuit, said isolating means preventing all tone sources from being extended to said cord circuit, a plurality of sources of interrupted ground pulses with one source transmitted back over said EC conductor simultaneously with one of said tones, said pulsing relay responsive to interrupted ground pulses received over said EC conductor to intermittently reverse the polarity to said polarized relay to cause intermittent operation thereof, and said polarized relay responsive to said intermittent reversals of polarity to flash said supervisory lamp at a predetermined rate indicative of one of said conditions for visibly indicating the condition existing.

6. In an extended toll telephone connection, an operator's cord circuit, a dial trunk, a pulse repeater, a connector switch and the terminals of a called line in serial relation, in combination with a supervisory lamp in the cord circuit, a first polar relay in said dial trunk, a first battery feed relay in said pulse repeater connected to said first polar relay, means in said connector switch for transmitting ground pulses back to said pulse repeater in case the connector switch is operated to the terminal of a busy called line, a first battery reversal relay in said pulse repeater operated by said ground pulses to intermittently reverse battery from said battery feed relay to said first polar relay to intermittently operate said first polar relay, a circuit controlled by said first polar relay for flashing said lamp responsive to the intermittent operations of said first polar relay to indicate a connection to a busy called line, means in said connector switch for transmitting a steady ground connection back to said pulse repeater in case the connection is operated to the terminals of an idle called line, said first battery reversal relay in said pulse repeater operated steadily by said steady ground connection to reverse battery from said first battery feed relay to operate said first polar relay and close said lamp circuit to steadily light said lamp, thereby indicating a connection to an idle called line, a second battery feed relay in said connector switch, operated in response to a called subscriber answering for reversing battery back to said pulse repeater, a second polar relay in said pulse repeater operated responsive to said last mentioned reversal of battery, switch-through means operated by the operation of said second polar relay for restoring said first battery reversing relay, for disconnecting said first battery feed relay from said first polar relay and for connecting said first polar relay to said second battery feed relay, and said connection of said second battery feed relay to said first polar relay completing a talking circuit from said cord circuit to said called line and also causing the restoration of said first polar relay to open said lamp circuit, to extinguish said lamp, and to indicate an answer condition by the called subscriber.

7. An extended toll telephone connection as claimed in claim 6, including means for extending tones simultaneously with any of said ground pulses over said connection, and blocking means controlled by said switch-through means for blocking all tones to said operator's cord circuit.

8. In a telephone exchange system, a calling line, a cord circuit, trunking means including automatic switches for extending a connection to a called line, a supervisory lamp in said cord circuit, relay means in said trunking means for controlling said supervisory lamp, a plurality of tone sources, means controlled by conditions existing during an attempted build-up of said connection for extending a tone from one of said tone sources back to said trunking means, pulsing means transmitted simultaneously with said tones for flashing said supervisory lamp at a predetermined rate indicative of one of said conditions, blocking means for blocking all tones from being transmitted back over said cord circuit, and means responsive only to a called party answering a call upon the connection being extended thereto for removing said blocking means.

9. In a telephone exchange system, a local subscriber and a toll operator's position, a cord circuit, a trunking circuit, automatic switches commonly accessible to either said local subscriber or said toll operator, means controlled via said cord circuit and said trunking circuit for operating said switches to build up a toll connection to a called line, means operated by the initiation of said local subscriber for controlling said switches to build up a local connection to the called line, a supervisory lamp in said cord circuit, relay means in said trunking circuit controlling said supervisory lamp, a plurality of tone sources controlled by conditions existing during an attempted build-up of said connection for transmitting a tone from one of said tone sources back over the connection, a plurality of sources of pulses with one of said sources of pulses transmitted back over said connection simultaneously with one of said tones, said tones audibly indicative to a local calling subscriber as to the conditions existing during said build-up of said connection, blocking means in said trunking circuit for blocking all tones from being extended to said cord circuit, and said relay means responsive only to said pulses for flashing said supervisory lamp at a predetermined rate indicative of said conditions for visibly indicating the condition existing during said attempted build-up of the connection to the called line.

10. In a telephone exchange system, a local subscriber, a toll operator's position, a cord circuit, a trunking circuit, automatic switches commonly accessible to either said local subscriber or said toll operator, means controlled via said cord circuit and said trunking means for operating said switches to build up a toll connection including a loop circuit to a called line, means operated by the initiation of said local subscriber for controlling said switches to build up a local connection including a loop circuit to the called line, a supervisory lamp in said cord circuit, relay means in said trunking circuit controlling said supervisory lamp, a plurality of tone sources controlled by conditions existing during an attempted build-up of said connection for extending a tone from one of said tone sources back over the loop circuit, a plurality of sources of pulses with one of said sources of pulses transmitted back over said connection simultaneously with one of said tones, said tones audibly indicative to a local calling subscriber as to the conditions existing during said build-up of said connection, blocking means in said trunking circuit for blocking all tones over said loop circuit from being extended to said cord circuit, said relay means responsive only to said pulses for flashing said supervisory lamp at a predetermined rate indicative of said conditions for visibly indicating the conditions existing during said attempted build-up of the connection to the called line.

11. A telephone exchange system as claimed in claim 10, including a polar relay in said trunking circuit, means responsive to a calling party answering a call for operating said polar relay to disconnect said blocking means to permit conversation over said loop circuit.

References Cited in the file of this patent

UNITED STATES PATENTS

| | | |
|---|---|---|
| 2,516,788 | Molnar | July 25, 1950 |
| 2,693,507 | Ridd | Nov. 2, 1954 |
| 2,708,692 | Wicks | May 17, 1955 |
| 2,801,286 | Lomax | July 30, 1957 |

UNITED STATES PATENT OFFICE
CERTIFICATE OF CORRECTION

Patent No. 2,994,744 August 1, 1961

Clarence E. Lomax

It is hereby certified that error appears in the above numbered patent requiring correction and that the said Letters Patent should read as corrected below.

Column 14, line 10, after "switch," insert -- a second battery reversing relay in said connector switch --.

Signed and sealed this 12th day of June 1962.

(SEAL)
Attest:

ERNEST W. SWIDER
Attesting Officer

DAVID L. LADD
Commissioner of Patents